United States Patent Office 2,730,671
Patented Jan. 10, 1956

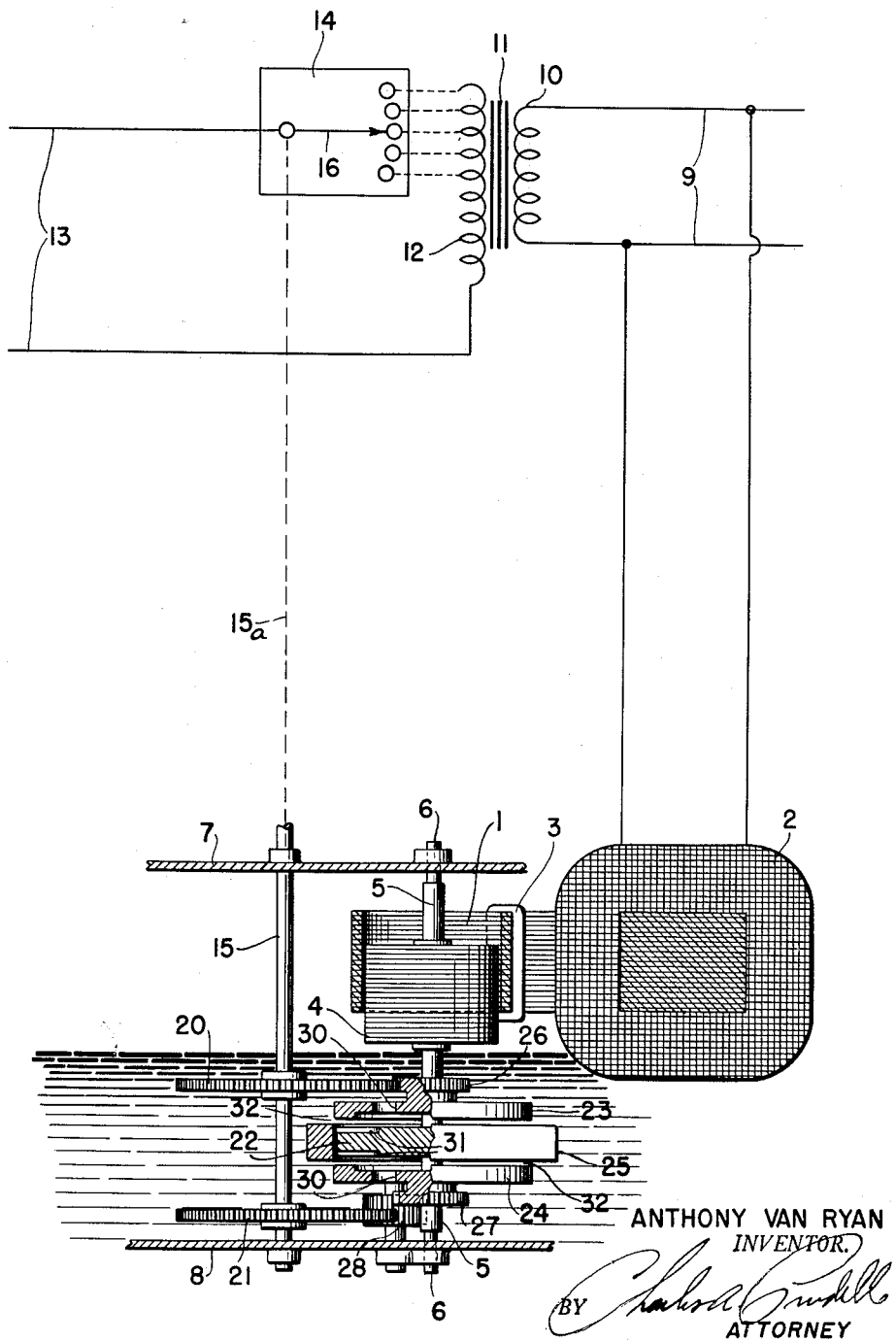

2,730,671

ELECTRO-MECHANICAL CONTROL MEANS

Anthony Van Ryan, South Milwaukee, Wis., assignor to McGraw Electric Company, Milwaukee, Wis., a corporation of Delaware Application March 16, 1951, Serial No. 216,050

6 Claims. (Cl. 323—43.5)

This invention relates to a control device for regulating an electrical quantity.

The most obvious use of the novel device is to control the selection of taps on a tapped winding of a transformer. It will be apparent from the following description, however, that the voltage sensitive device may be incorporated in various types of automatic and remote control applications.

It is an object of this invention to provide an electro-magnetic, control device for automatically regulating an electrical quantity, and responsive to varying conditions in that quantity.

It is a further object of this invention to provide an electro-magnetic driving device capable of imparting rotational motion in either direction, said direction being determined by the degree of electrical energy impressed thereon.

Specifically, it is an object of this invention to provide an electro-magnetic driving device directionally responsive to fluctuations in voltage impressed on the energizing coil field structure.

An embodiment of the invention is shown in the accompanying drawing, in which the single figure is a fragmentary view, partly in diagram and partly in section showing the novel device used as a transformer tap changer control mechanism.

Referring to the drawing, it will be seen that the device, which is in the form of a shaded pole motor, includes a field structure 1 with an energizing coil 2 and shading windings 3. An armature or rotor 4 is secured to a bushing sleeve 5 and normally continually revolves about a spindle 6. As shown, the rotor is positioned about a vertical axis with connected parts supported by the same magnetic field that induces rotation. Accordingly, its position vertically relative to the stator will be a function of the voltage supplied to the energizing coil 2.

The spindle 6 is supported between an upper structure 7 and a lower structure 8. The sleeve 5 is freely rotatable on the spindle, and is also positioned to freely move in either direction longitudinally of its axis.

In the embodiment shown, the energizing coil 2 is electrically connected to the load lines 9 supplied by a secondary winding 10 of a transformer 11. The transformer 11 is further provided with a primary winding 12 supplied by power lines 13. A tap changer, indicated generally by the reference character 14, is provided on the primary side of the transformer. This tap changer is preferably of the multiple point, snap-action type very commonly and widely used.

A power take-off countershaft 15 is also supported between the upper and lower structures 7 and 8, and is rotatable in either direction. The shaft 15 is shown diagrammatically connected by the broken line 15a with a tap arm 16 for changing the tap connections. It will be obvious that rotational motion in either direction may be provided through a series of reducing gears (not shown), or by direct drive if so desired. Upper and lower driven gears 20 and 21, respectively, are firmly attached to the countershaft 15, driving the shaft in either direction responsive to electrical quantity variations impressed on the energizing coil 2, as will hereinafter be described. Rotational motion is alternatively imparted to the driven gears 20 and 21 utilizing any of a number of known clutching devices. As shown herein, the novel control device employs a hydraulic clutching arrangement specifically disclosed and claimed in the copending application of Edward J. Weinfurt, Serial No. 216,287, filed March 19, 1951, and assigned to the same assignee as the present invention.

This clutching mechanism, which is immersed in oil or some other hydraulic medium, includes a driving disk 22 secured to the bushing sleeve 5 rotating as a unit with the rotor 4. The driving disk 22 alternatively supplies rotational energy to driven disks 23 and 24, which are freely rotatable independent of the bushing sleeve 5 and the spindle 6. In addition, both driven disks 23 and 24 are freely slidable longitudinally of the axis of the sleeve 5. A stationary flow control cylinder plate 25 encircles the driving disk 22, which is normally positioned centrally of the cylinder plate. The flow control cylinder may be simply constructed by boring a circular opening in a substantially flat plate of the same or slightly greater thickness than the driving disk 22. This circular opening is preferably of sufficient diameter to provide a free fit to the driving disk 22, permitting either axial or rotational motion of the disk.

Each of the driven disks 23 and 24 is provided with integral pinion gears 26 and 27, respectively. The upper pinion gear 26 meshes with the driven gear 20 positioned on the countershaft 15. The thickness of the pinion gear 26 and/or the driven gear should be sufficient to permit a predetermined endwise motion of the pinion gear 26 in either direction without disengagement of meshed gear teeth. The lower pinion gear 27 preferably engages the gear teeth of an idler pinion 28. The pinion 28 provides a means for reversing direction and meshes with the teeth of the driven gear 21. The teeth of the driving pinion gear 27 and/or the idler pinion 28 are preferably of sufficient thickness to permit endwise motion of the pinion gear 27 in either direction without unmeshing the gear teeth.

The driven disks 23 and 24 of the hydraulic clutching mechanism are each further provided with a plurality of annularly spaced oil intake ports 30. Each of the opposed sides of the driving disk 22 is provided with a series of circumferentially spaced radial oil exit grooves 31 along its outer periphery. An oil exit port 32 is provided on either side of the driving disk 22 and consists merely of the circumferential space normally existing between the driven disks 23 and 24 and the plate 25.

The novel device operates as follows: When a current is induced in the secondary 10 of the transformer 11, it will accordingly energize the coil 2. This coil produces an electromagnetic field in the field structure 1. The rotor 4 will be caused to continually rotate along with the sleeve 5 on the spindle 6. The driving disk 22 of the hydraulic clutching mechanism, which is also secured to the sleeve 5, will thus continually revolve in a single direction.

In the embodiment shown in the drawing, the novel device will act to regulate an electrical quantity, such as voltage supplied to the load lines 9. Predetermined nominal voltage will permit the driving disk 22 to be normally centered in the cylinder plate 25.

The novel device is illustrated with the rotor 4 rotating about a vertical axis. Thus, a downward force of gravity is utilized to retain the vertical position of the rotor at predetermined electrical quantities. It will be obvious that any of well-known biasing means (not shown) may be used for the same purposes if the device is operated in any other position as shown.

Assuming an over-voltage condition in the load lines 9, the rotor 4 will be drawn upwardly in the field structure 1 carrying with it the bushing sleeve 5 and the driving disk 22 of the hydraulic clutching mechanism. It is to be noted that the rotor 4 and the driving disk 22 continually rotate independent of varying voltage conditions impressed upon the energizing coil 2. In operation, the oil adjacent the driving disk 22 is set in rapid circular motion. Because of the resultant centrifical force, this oil normally escapes from the oil exit grooves 31 through the oil exit port 32, and is replaced by oil entering through the oil intake ports 30 of the driven disks 23 and 24. Pressure from this oil flow normally causes the driven disks to float away from the flow control cylinder plate 25. Under normal operating conditions, the rotational forces imparted to the driven disks will be at a minimum, tending to equally oppose one another preventing either of the driven disks from rotating.

As the driving disk 22 moves upwardly during over-voltage conditions, it will tend to increase the size of the oil exit port 32 between the upper driven disk 23 and the driving disk 22. With the exit port open, oil can no longer be supplied through the intake ports 30 of the upper driven disk 23 at the same rate that it escapes. This results in a decreased pressure between the driving disk and the upper driven disk forcing them into close engagement. The engaged disks will then rotate as a unit, which rotational motion will be transferred to the upper driven gear 20 through the driving pinion gear 26. The countershaft 15 will now be caused to rotate, which rotational motion may be translated to the tap arm 16 of the tap changer 15 shown diagrammatically connected in the drawing by the broken line 15a. The tap arm 16 will be caused to move to another tap of the primary winding 12 of transformer 11. Accordingly, predetermined normal voltage will eventually be restored to the load lines 9, simultaneously decreasing voltage impressed upon the energizing coil 2 of the novel control device.

When normal voltage is restored, the rotor 4 will settle downwardly. The driving disk 22 of the hydraulic clutching mechanism will also move downwardly. As the driving disk settles centrally of the plate 25, the exit port 30 between the upper driven disk 23 and the driving disk will be restricted providing increased oil pressure between the disks, which pressure acts to separate them. In addition, the driven disks 23 and 24 preferably have a diameter slightly larger than the diameter of the opening in the cylinder plate 25. This will prevent the driven disk from entering the cylinder as the driving disk settles when normal voltage is restored, further aiding separation of both disks.

Similar action will take place during an under-voltage condition with the lower driven disk 24 being engaged by the driving disk 22, thereby being caused to rotate. The reduced voltage will permit gravity to act on the rotor 4 causing the rotor and driving disk 22 to engage the disk 24. Obviously, any biasing means may be used instead of gravitational action. Since the rotational motion of both the upper and lower driven disks 23 and 24 is in the same direction, the pinion gear 27 of the lower driven disk 24 preferably meshes the idler pinion 28. Engagement of the gear teeth on the idler pinion 28 and the lower driven gear 21 positioned on the countershaft 15 will cause the countershaft to rotate in an opposite direction than when driven by the upper pinion gear 26. The rotational motion of the countershaft will be translated to the tap arm 16 of the tap changer 14, moving the same in a direction to permit increased voltage to be supplied from the primary winding 12 of the transformer 11.

The novel control device is an entirely self-contained unit and may be suitably mounted in a transformer tank if used for automatic regulation or may be separately contained with its own source of hydraulic fluid. It will be apparent that the device may be made to function with various other well-known clutching mechanisms operating without necessitating a hydraulic medium.

The expression "coil" used throughout this specification is intended to be broadly construed to cover any of the commonly used hydraulic operating fluids, in addition to electrical dielectric cooling fluids.

It will be seen that a novel electro-magnetic rotating device has been provided by this invention, and which device when combined with an appropriate clutching mechanism is capable of changing direction of drive responsive to the degree of supplied electrical energy. The device further provides a means of amplifying exceedingly small axial forces produced by voltage changes impressed thereon. Although the device has been shown in conjunction with a transformer tap changer, it will be obvious that it may be used to provide rotational motion in either direction to a working countershaft, which direction may be determined remotely by varying the degree of electrical energy supplied to the device.

I claim:

1. In an alternating current electrical system comprising an electric line, a transformer having a primary and a secondary winding, and a tap changing device having a rotatably operable contact arm arranged to selectively electrically connect predetermined portions of one of said windings with said line, the combination with a unitary regulatory device comprising an electromagnetic field structure having opposed pole pieces, an energizing coil on said field structure electrically connected with said transformer secondary winding, a rotor positioned between said pole pieces and arranged to normally unidirectionally rotate, and reversibly rotatable power translating means operatively associated with said tap changing device to rotatably actuate said contact arm, said rotor being freely movable longitudinally of its axis simultaneously with its rotation responsive to variations in electrical energy supplied to said coil, said translating means operatively associated with said rotor and arranged to alternatively reversibly drive said power translating means responsive to the longitudinal movement of said rotor, whereby the operation of said tap changing device will be directly responsive to electrical quantity variations in said coil.

2. In an alternating current electrical system comprising an electric line, a transformer having a primary and a secondary winding, and a tap changing device having a rotatably operable contact arm arranged to selectively electrically connect predetermined portions of one of said windings with said line, the combination with a unitary regulatory device comprising an electromagnetic field structure having opposed pole pieces, an energizing coil on said field structure electrically connected with said transformer secondary winding, a rotor positioned between said pole pieces and arranged to normally unidirectionally rotate, and reversibly rotatable power translating means operatively associated with said tap changing device to rotatably actuate said contact arm and including rotational clutch means, said rotor being freely movable longitudinally of its axis simultaneously with its rotation responsive to variations in electrical energy supplied to said coil, said rotational clutch means operatively associated with said rotor and arranged to alternatively reversibly drive said power translating means responsive to the longitudinal movement of said rotor, whereby the operation of said tap changing device will be directly responsive to electrical quantity variations in said coil.

3. In an alternating current electrical system comprising an electric line, a transformer having a primary and a secondary winding, and a tap changing device having a rotatably operable contact arm arranged to selectively electrically connect predetermined portions of one of said windings with said line, the combination with a unitary regulatory device comprising a field structure having opposed pole pieces and an energizing winding electrically connected with said secondary winding, a normally unidirectional rotating armature, said armature being freely movable longitudinally of its axis simultaneously with its rotation responsive to variations of electrical energy in said secondary winding, power translating means including an hydraulic rotational clutch mechanism, said clutch mechanism comprising a driving disk operatively associated with said armature, opposed driven disks each being freely movable rotationally and slidable axially relative to said driving disk, and reversible power takeoff means operatively associated with said tap changing device and arranged to be alternatively rotationally driven by said driven disks responsive to longitudinal movement of said driving disk, whereby the operation of said tap changing device will be directly responsive to electrical quantity variations in said secondary winding.

4. A reversible, alternating current, rotary drive means, comprising an electromagnetic pole structure, a single energizing winding on said pole structure adapted to be connected to a source of alternating current, a rotatable armature within said pole structure continuously and unidirectionally rotated within said pole structure when said winding is connected to said source, said armature varying its position in said pole structure in accordance with changes in the magnitude of the voltage of said source, an energy delivery shaft operatively connected to said armature and rotatable alternatively in opposite directions, and direction controlling means controlled by the position of said armature for alternatively selectively controlling the direction of rotation of said shaft.

5. A reversible, alternating current, rotary drive means, comprising an electromagnetic pole structure, a single energizing winding on said pole structure adapted to be connected to a source of alternating current electrical power, a rotatable armature within said pole structure continuously and uni-directionally rotated by the cyclic variations of the magnetic flux in said pole structure, said armature being shiftable axially in said pole structure in accordance with changes in the magnitude of the voltage of said source, an energy delivery shaft, rotatable alternatively in opposed directions, and direction controlling clutch means controlled by the magnitude of the voltage of said source for alternatively selectively controlling the direction of rotation of said shaft including a driving member rigid with said armature and a pair of driven members each operatively connected to said shaft and being alternatively engaged by said driving member in accordance with the axial position of said armature in said pole structure.

6. A reversible alternating current rotary drive means comprising a pole structure, an energizing winding on said pole structure adapted to be connected to a source of alternating current electrical power, a rotor magnetically suspended within said pole structure and continuously and uni-directionally rotated within said pole structure when said winding is connected to said source, said rotor varying its position axially within said pole structure in accordance with changes in the voltage of said source, a rotatable energy delivery shaft, and clutch means operatively connecting said shaft and said rotor for selectively controlling the direction of rotation of said shaft in accordance with the axial position of said rotor in said pole structure including a driving disk rigid with said rotor and opposed driven disks each operatively connected to said shaft, said rotor being shiftable axially when the voltage of said source is above a nominal value to engage said driving disk with one of said driven disks and also being shiftable axially when the voltage of said source is below said nominal value to engage said driving disk with the other of said driven disks.

References Cited in the file of this patent

UNITED STATES PATENTS

| | | |
|---|---|---|
| 2,009,383 | Blume | July 30, 1935 |
| 2,058,523 | Stearns | Oct. 27, 1936 |
| 2,525,489 | Jolly | Oct. 10, 1950 |
| 2,617,050 | Weinfurt | Nov. 4, 1952 |